United States Patent [19]

Baldwin

[11] Patent Number: 4,947,794
[45] Date of Patent: Aug. 14, 1990

[54] DISPOSABLE BIRDCAGE COVER ARRANGEMENT

[76] Inventor: Margaret K. Baldwin, 3703 Kerwin, Memphis, Tenn. 38128

[21] Appl. No.: 333,086

[22] Filed: Apr. 4, 1989

[51] Int. Cl.⁵ .............................................. A01K 29/00
[52] U.S. Cl. ...................................... 119/17; 150/154
[58] Field of Search .................... 119/21, 22, 23, 17, 119/15; 206/45, 33, 409, 494; 383/103, 72, 75; 150/154

[56] References Cited

U.S. PATENT DOCUMENTS

| | | | |
|---|---|---|---|
| 1,094,423 | 4/1914 | Brandt | 119/17 |
| 2,002,925 | 5/1935 | Robison | 119/17 |
| 2,994,424 | 8/1961 | Selby et al. | 206/423 |

FOREIGN PATENT DOCUMENTS

| | | | |
|---|---|---|---|
| 752077 | 9/1933 | France | 150/52 R |
| 197809 | 9/1978 | Netherlands | 383/103 |
| 245593 | 1/1926 | United Kingdom | 119/17 |

*Primary Examiner*—John Weiss
*Attorney, Agent, or Firm*—Leon Gilden

[57] ABSTRACT

A disposable birdcage cover arrangement is provided wherein a series of tubular birdcage covers formed of transparent polyethylene type plastic film are securable about an elongate birdcage. The opposed ends of the cover are open and include opposed elastic gathering bands for securement about the birdcage. A plural series of openings are arranged in an array adjacent the upper end of the birdcage cover to assist in air circulation throughout the birdcage. Further, a matrix of perforated sections are provided to enable removal of a desired section to provide access to an associated birdcage door.

4 Claims, 1 Drawing Sheet

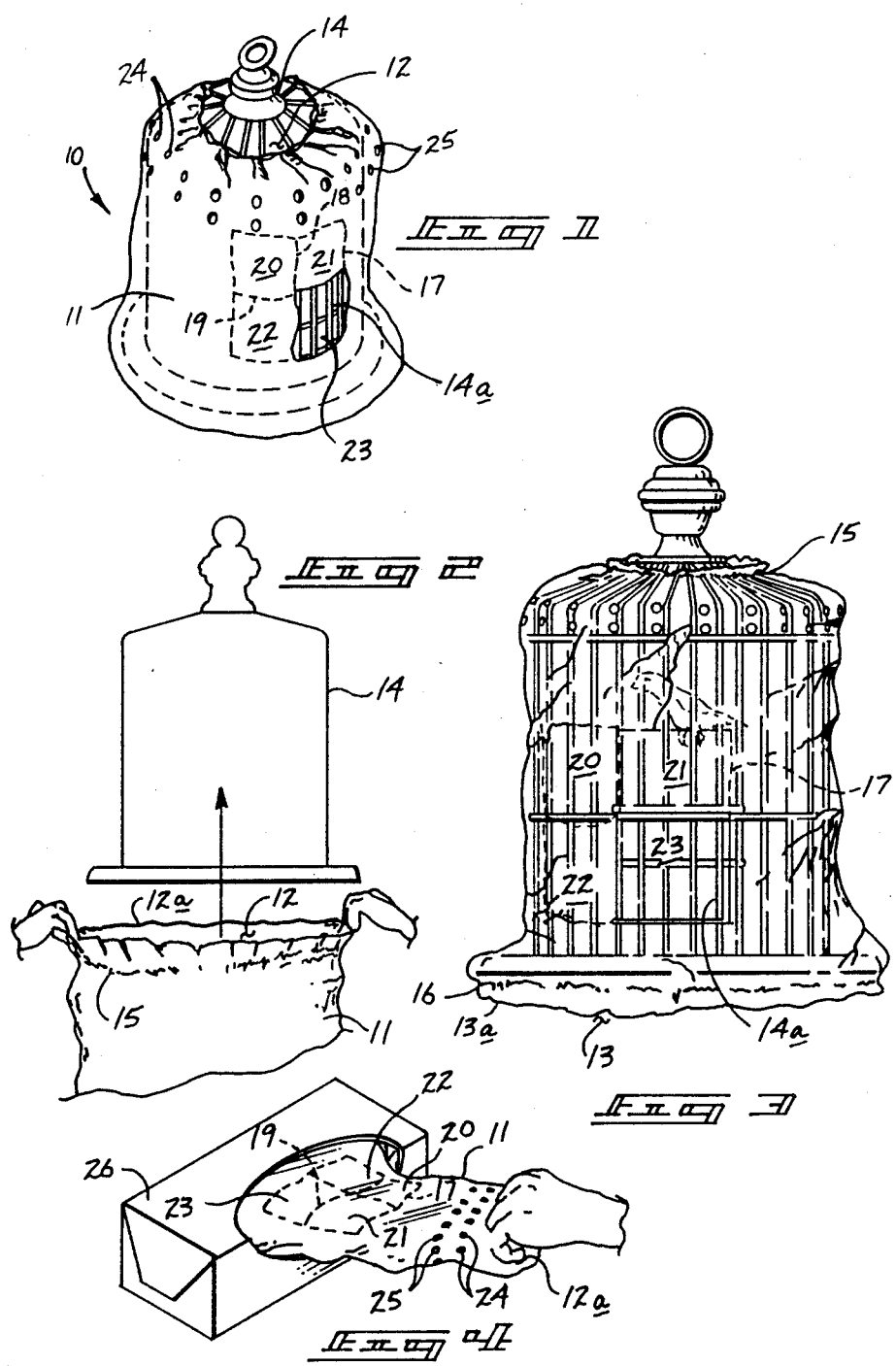

DISPOSABLE BIRDCAGE COVER ARRANGEMENT

BACKGROUND OF THE INVENTION

1. Field of the Invention

The field of invention relates to birdcage covers, and more particularly pertains to a new and improved disposable birdcage cover which may be readily secured about an existing elongate birdcage and thereafter discarded upon excess soiling of the cover.

2. Description of the Prior Art

Birdcage covers have been utilized throughout the prior art. Birdcage covers of the past, however, have not been of an elongate and disposable nature to enable discardment of such covers subsequent to their use. The covers of the prior art have typically been of a fabric-like covering and must be repeatedly cleansed to insure their sanitary utilization. Further, when covers of the prior art have attempted to shield a birdcage and prevent the debris associated with the ownership of a bird to be strewn about an associated floor and support surface, the covers have typically been of relatively shortened height and have provided a mere shield-like barrier about a lowermost portion of a birdcage. For example, U.S. Pat. No. 1,539,583 to Lindemann sets forth a birdcage shield disposed about a lowermost portion of an associated birdcage utilizing a wire and the like for securement of the relatively stiff shield about the birdcage.

U.S. Pat. No. 2,002,925 to Robison sets forth a covering bag for a birdcage wherein the bag is of a permeable type bag provided with a series of hooks to secure the bag medially of the birdcage wherein the bag may be disposed overlying the birdcage for covering of the cage during the evening hours.

U.S. Pat. No. 1,094,423 to Brandt sets forth a birdcage guard wherein a series of hooks secure an underlying guard to prevent disposing and array of debris from within the birdcage to an underlying support surface.

U.S. Pat. No. 341,540 to Armstrong sets forth a birdcage protector wherein a rigid hoop is secured by a series of hooks to a birdcage wherein an underlying cage is arranged to receive the debris from within the birdcage.

U.S. Pat. No. 186,711 to Chapin sets forth a birdcage screen utilizing a hingedly mounted two-part screen, the first part pivotally mounted and the second part utilizing a shield to be disposed about a lowermost portion of the birdcage.

U.S. Pat. No. 250,600 to Taft sets forth a birdcage and an associated guard wherein the guard is of a similar arrangement to the other prior art providing a shield circumferentially disposed about a lowermost portion of the cage.

U.S. Pat. No. 290,838 to Bishop sets forth a sun shade for birdcages wherein the sun shade is essentially a rectangular sheet with a central opening for overlying a birdcage, but affords no protection of an underlying support surface from debris from the birdcage.

U.S. Pat. No. 2,045,472 to Kearney sets forth a birdcage protector wherein a circumferential rigid hoop secures an underlying basket that is secured to a lowermost portion of &he birdcage to accommodate various debris from the bird cage within the semi-stiff fabric body.

As such, it may be appreciated that there is a continuing need for a new and improved disposable birdcage cover arrangement wherein the same provides for a disposable birdcage cover formed of a polymeric-type film that is securable about the full extent of a birdcage and provided with air passages and various perforated sections to accommodate the door of a birdcage and access therein.

SUMMARY OF THE INVENTION

In view of the foregoing disadvantages inherent in the known types of bird cage covers now present in the prior art, the present invention provides a disposable birdcage cover arrangement wherein the same is provided with a series of dispensable birdcage covers formed as open tube arrangements with various segments to afford ventilation and access interiorly of an associated birdcage. As such, the general purpose of the present invention, which will be described subsequently in greater detail, is to provide a new and improved disposable birdcage cover which has all the advantages of the prior art birdcage covers and none of the disadvantages.

To attain this, the present invention comprises an elongate transparent plastic-like tube formed with open ends of a diameter less than that of the tube and provided with elastomeric gathering bands adjacent each open end of the tube. A matrix of perforated segments is arranged adjacent a lowermost end of the tube to enable removal of various sections to provide access to a door of an associated birdcage. A plurality of annular arrays of openings adjacent the upper end of the tube to effect enhanced ventilation of the interior of the tube and associated birdcage.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disposable bird cage cover which has all the advantages of the prior art bird cage covers and none of the disadvantages.

It is another object of the present invention to provide a new and improved disposable birdcage cover which may be easily and efficiently manufactured and marketed.

It is a further object of the present invention to provide a new and improved disposable birdcage cover which is of a durable and reliable construction.

An even further object of the present invention is to provide a new and improved disposable birdcage cover which is susceptible of a low cost of manufacture with regard to both materials and labor, and which accordingly is then susceptible of low prices of sale to the consuming public, thereby making such disposable birdcage covers economically available to the buying public.

Still yet another object of the present invention is to provide a new and improved disposable birdcage cover which provides in the apparatuses and methods of the prior art some of the advantages thereof, while simultaneously overcoming some of the disadvantages normally associated therewith.

. Still another object of the present invention is to provide a new and improved disposable birdcage cover that is readily securable about an associated birdcage and provided with access and ventilation openings with the use of the birdcage. The cover is disposable upon an elapsed period of time and a soiling of the cover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view of the instant invention and its securement about an associated birdcage.

FIG. 3 is an orthographic view taken in elevation of the instant invention.

FIG. 4 is an isometric illustration of the birdcage cover in association with a dispensing package.

DESCRIPTION OF THE PREFERRED EMBODIMENT

With reference now to the drawings, and in particular to FIGS. 1 to 4 thereof, a new and improved disposable birdcage cover arrangement embodying the principles and concepts of the present invention and generally designated by the reference numeral 10 will be described.

More specifically, it will be noted that the disposable birdcage cover arrangement 10 essentially comprises an elongate tubular cover 11 performed with an open top end 12 and a spaced parallel open bottom end 13 wherein the open top end is defined by an upper terminal peripheral edge 12a and the open bottom end 13 is defined by a lower terminal peripheral edge 13a. The upper and lower terminal edges 12a and 13a respectively are spaced parallel to one another to position the edges within the longitudinal extent of the associated birdcage 14. The birdcage 14 is also formed with a conventional birdcage door 14a enabling access interiorly of the birdcage.

An upper elastomeric gathering band 15 is interlaced through the tubular cover 11 adjacent the upper terminal peripheral edge 12a with a lower elastomeric gathering band 16 interlaced through the tubular cover 11 adjacent and parallel the lower terminal peripheral edge 13a. The gathering bands 15 and 16 secure the tubular cover to the birdcage and position the upper peripheral edge 12a below the upper end of the birdcage to enable ventilation interiorly of the birdcage with the lower elastomeric band 16 secured above the lower edge of the birdcage to provide an enclosing engagement with the peripheral lowermost side of the birdcage to capture any debris strewn from the birdcage and prevent its deposit upon an underlying surface relative to the birdcage.

The tubular cover 11 further includes a series of rectangular sections to provide access to the aforenoted birdcage door 14a. The sections are defined by a perforated rectangle 17 with bisecting first and second perforation lines 18 and 19 respectively that are oriented orthogonally to each other and to the opposed sides of the perforated rectangle 17 to define four rectangular sections including a first rectangular section 20, a second rectangular section 21, a third rectangular section 22, and a fourth rectangular section 23. In the illustration of FIG. 3, the fourth rectangular section 23 has been selectively removed to provide access to the interior of the birdcage and orient the fourth section overlying the birdcage door 14a. The series of sections 20 through 28 are utilized to accommodate a birdcage door relative to a birdcage in a different orientation and thereby enable the tubular cover 11 to accommodate variations in birdcage layout.

To further enhance ventilation interiorly of the birdcage 14, a first annular perforated array 24 and a second annular perforated array 25 are disposed underlying the lower elastomeric gathering band 16 wherein the first and second annular perforated arrays 24 and 25 are spaced generally parallel to one another and are provided with through-extending openings through the wall of the tubular cover 11 to enable circulation of air therethrough. It should further be noted that the tubular cover 11 is formed of a polymeric or polyethylene and is desirably transparent but may include various tinting agents to provide a decorative hue about the birdcage and thereby color coordinate a birdcage relative to an interior of an existing dwelling containing the birdcage.

FIG. 4 is illustrative of a dispensing container 26 containing a stacked or endless array of the tubular covers 11 for easy removal upon soiling of the formed tubular cover utilized about the birdcage. When sufficient debris has been accumulated within &he tubular cover 11, and more particularly adjacent the lower elastomeric band 16, the tubular cover is merely withdrawn downwardly in a reverse direction to that of FIG. 2 to remove the cover and thereby enabling disposal of the debris and securement of a further tubular cover about the birdcage to provide a sanitary confinement of such debris associated with the keeping and care of birds, such as feathers, seed, and other debris.

As to the manner of usage and operation of the instant invention, the same should be apparent from the above description and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A disposable birdcage cover for securement about an elongate birdcage comprising,
   a flexible transparent tubular member including an upper continuous edge defining an open upper end,
   a lower continuous edge spaced from and parallel to said upper edge defining an open lower end, and
   first and second securement means positioned adjacent the upper and lower edges respectively for securement of said tubular member adjacent the upper and lower surfaces of the birdcage, and
   wherein the first and second securement means include a respective first and second elastomeric gathering band interlaced through the tubular member wherein the first and second gathering bands are parallel to each other and to the upper and lower edges, and
   further including a plurality of selectively removable sections for selective removal of a section to provide access to a door of the birdcage, the sections comprising a first, second, third, and fourth rectangular section defined by a perforated rectangle and a first and second bisecting perforated line wherein the first and second bisecting perforated line are orthogonal to each other and to opposed sides of the perforated rectangle.

2. A disposable birdcage cover as set forth in claim 1, wherein the tubular member further includes at least one annular perforated array of through-extending apertures positioned adjacent and underlying the upper elastomeric gathering band to provide enhanced ventilation interiorly of the tubular member.

3. A disposable birdcage cover as set forth in claim 2 wherein the tubular member is formed of a flexible polyethylene material.

4. A disposable birdcage cover as set forth in claim 3 wherein a series of tubular members are secured in edge to edge relationship and secured within a dispensing container for individual dispensing of the tubular covers.

* * * * *